April 1, 1958  J. C. GREY  2,828,939
SUPPORT OF TURBINE CASINGS AND OTHER STRUCTURE
Filed Sept. 10, 1951  4 Sheets-Sheet 1

Inventor
John Constantine Grey
By Stevens, Davis, Miller & Mosher
his Attorneys

April 1, 1958 J. C. GREY 2,828,939
SUPPORT OF TURBINE CASINGS AND OTHER STRUCTURE
Filed Sept. 10, 1951 4 Sheets-Sheet 2

April 1, 1958            J. C. GREY            2,828,939

SUPPORT OF TURBINE CASINGS AND OTHER STRUCTURE

Filed Sept. 10, 1951            4 Sheets-Sheet 3

Inventor
John Constantine Grey
By Stevens, Davis, Miller & Mosher
his Attorneys

Inventor
John Constantine Grey
By Stevens, Davis, Miller & Mosher
Attorneys

United States Patent Office 2,828,939
Patented Apr. 1, 1958

2,828,939

SUPPORT OF TURBINE CASINGS AND OTHER STRUCTURE

John Constantine Grey, Isleworth, England, assignor to Power Jets (Research & Development) Limited, London, England, a British company Application September 10, 1951, Serial No. 245,904

Claims priority, application Great Britain September 20, 1950

4 Claims. (Cl. 253—39)

This invention relates to a supporting arrangement for a structure external to rotary machinery which structure is to be maintained in geometrically similar relationship with the shaft of the said machinery despite appreciable expansion of the structure. It is particularly applicable for the support of the drum-like exhaust casings of gas turbine plant where high temperature fluid flow is experienced. In such a case the differential expansion of different parts of the plant and the small clearances allowable between rotor and stator blades makes the problem of thermal expansion a serious one.

It has been common practice with much rotary machinery built in the past, to strengthen the construction and mounting so as to resist thermal expansion at least partially. Design has allowed for thermal stresses up to predetermined value to be accommodated. Distortion has not been avoided at all cost. This attitude has been upheld because, in general, the temperatures reached have not been high enough for critical conditions to be reached. With the advent of gas turbine plant however much higher working temperatures have become usual. One gas turbine has been run for two hours with a gas flow temperature of 1260° C. and it is likely that other plant designed to operate at such temperatures will follow, for the prospective gain in thermal efficiency is most attractive. It is clear then that attention has to be paid to the thermal expansion problem and moreover any attempt to resist such expansion is aforedoomed to failure.

In one gas turbine installation the turbine casing is supported by an arrangement designed to accommodate small movements of the mounting without passing torsional effects on to the machinery proper. The supporting arrangement is made somewhat flexible, lateral movement of the shaft axis being permitted. Expansion of the casing itself is said not to displace the engine axis to any appreciable extent.

According to the present invention there is provided a supporting arrangement for a structure external to rotary machinery, which structure is to be maintained in geometrically similar relationship with the shaft of the said machinery despite appreciable expansion of the structure, characterized by at least three attachment devices on the outside of the structure, at least one mounting, fixed in space, on either side of a vertical plane through the shaft axis, by at least three links each of which is pivotally connected on the one hand to an attachment device and on the other hand to a mounting and by the attachment devices, links and mountings being relatively positioned such that each link is substantially normal to a line joining the shaft centre to the attachement device to which it is connected.

Two axially-spaced mountings may be provided on either side of the structure. Two links may be pivotally connected to a single mounting, and in any case the links may be internally cooled. The supported structure may carry within itself a stationary part of the machinery and if this is so any tendency for differential expansion between the stationary part and the structure is allowed for.

The invention will now be particularly described with reference to one embodiment of the invention and other possible embodiments will be indicated. In the drawings.

Figure 1:
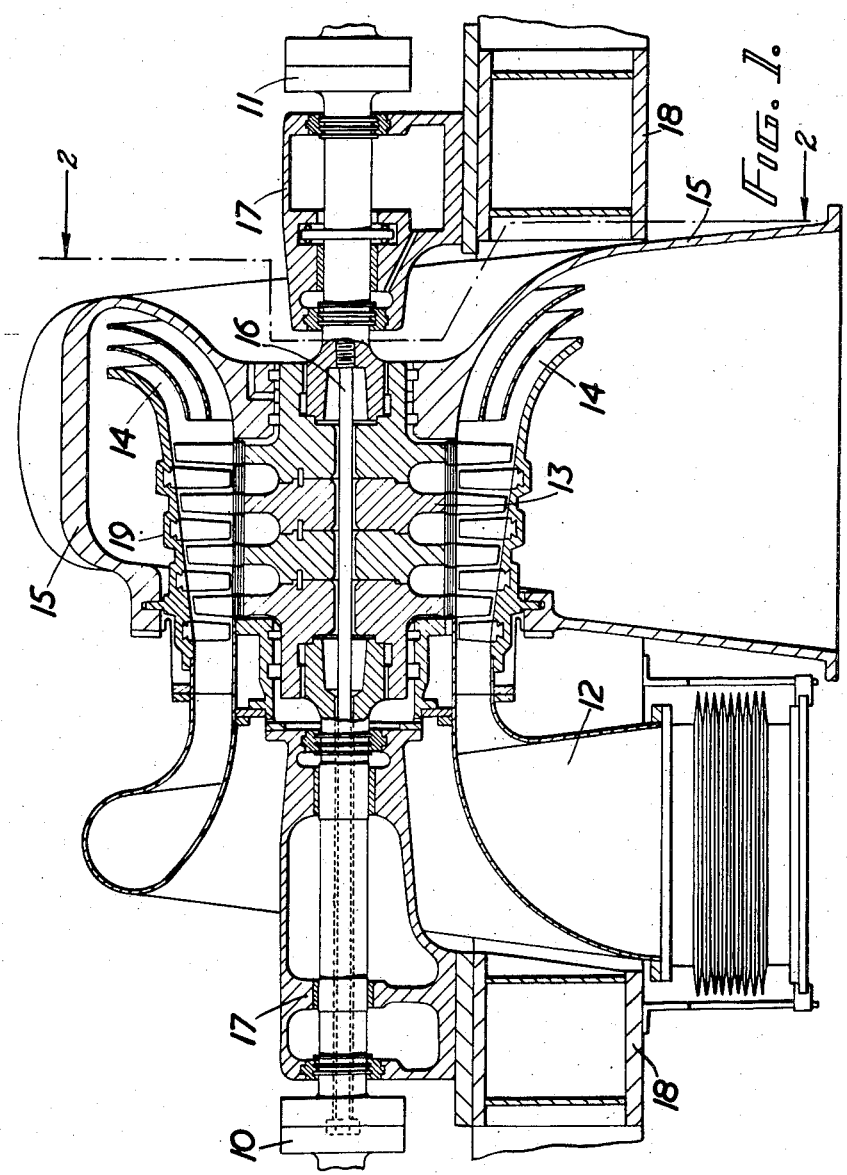
Figure 1 is a longitudinal section through a gas turbine, the supporting arrangement for the casing structure of which forms the subject of the particular embodiment of the present invention.

Figure 1 shows the gas turbine itself which forms part of an industrial gas turbine plant. By means of the couplings 10 and 11 the gas turbine is connected to both high and low pressure compressors respectively. The hot gas from the combustion system is introduced into the intake casing 12 from whence it passes into the four-stage turbine 13. Beyond the turbine the gases pass through the duct 14, with its guide vanes into the exhaust casing 15.

The turbine rotor 13 is mounted on a shaft 16 which is supported by bearings 17 at either end, the bearings resting on bed-plates 18.

The operation of the gas turbine forms no part of the invention and will not be described but it should be noted that the gas temperatures employed are relatively high compared with those experienced in previous rotary machinery forming part of a stationary plant. With this in mind it will be clear that the exhaust casing structure 15 is likely to expand an appreciable amount during operation of the turbine. It is necessary that during this thermal expansion, the supporting arrangement should maintain the casing in similar geometrical radial relationship with the axis of the shaft 16 as it is clearly impracticable to withstand the expansion. Efforts to resist the expansion would result in serious distortion of the casing and if the casing were of a thick section the internal stresses set up would very probably cause fracture. Moreover, in this particular machine the casing 15 carries internally the stator blade carrier 19 which forms also the annular outer wall of the fluid passage through the turbine. Any distortion of the casing structure owing to thermal expansion would also distort the stator blading which is carried thereby, with consequent fouling of the rotor and stator blading of the turbine.

Figure 2:
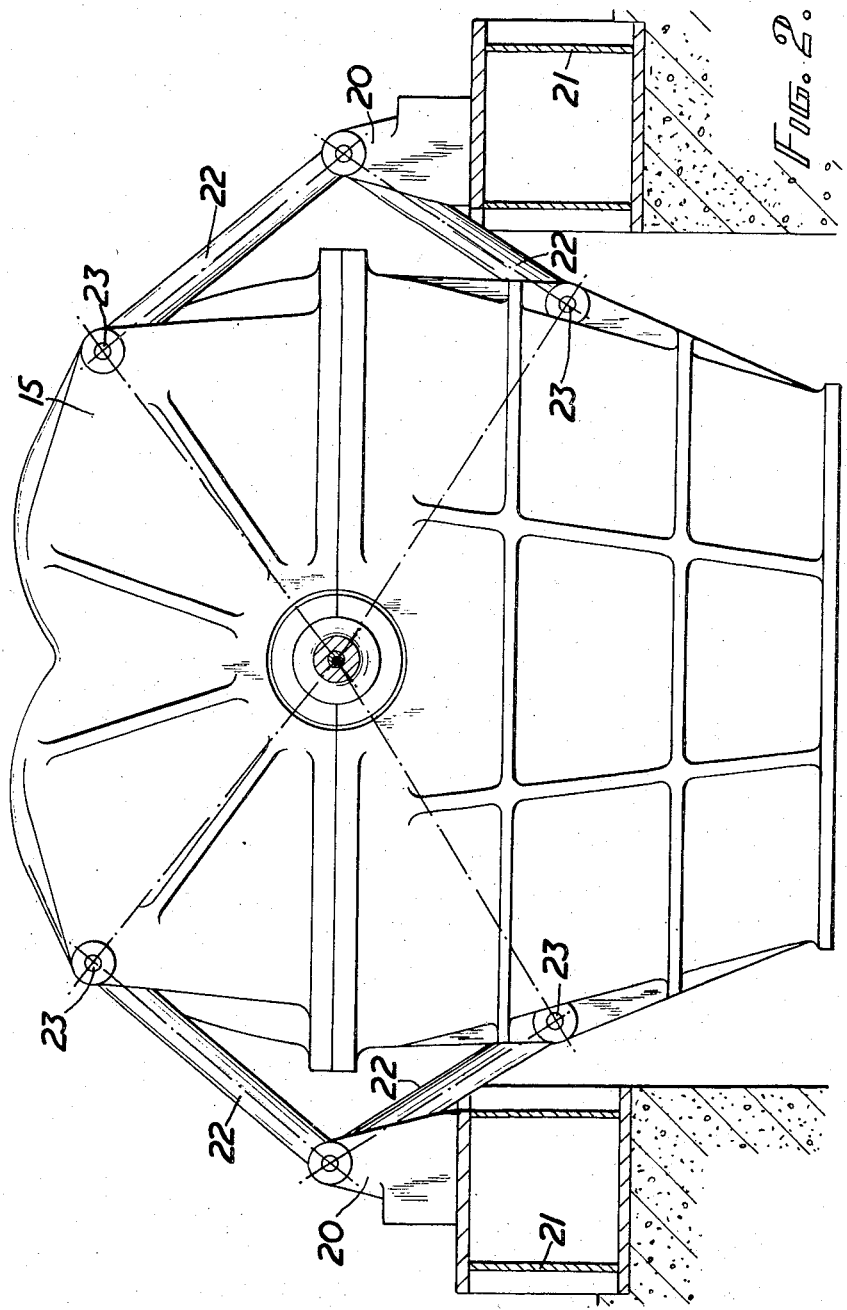
Figure 2 is a section on the line 2—2 of Figure 1.

The supporting arrangement for the casing structure is more clearly seen in Figure 2. Fixed mountings are provided at 20 on both sides of a vertical plane through the shaft axis. These mountings rest upon rigid bed-plates 21. Pivotally connected to the mountings 20 are links 22 which carry the weight of the casing structure. Each of the links is pivotally connected on the one hand to a mounting 20 and on the other hand to an attachment device, an eye bolt as shown at 23, on the outside of the casing. These attachment devices are positioned relative to the mountings and the shaft axis so that when the casing and the supporting arrangement are assembled together the line joining the shaft axis to any one of the attachment devices is substantially at right angles to the link 22 joining that particular attachment device to a mounting. The right angle intersection of the link with the line mentioned is adopted in order to reconcile as far as possible the necessarily arcuate motion of the link with the rectilinear motion under thermal expansion of the casing structure at the eye bolts 23. The angle of intersection should preferably be between 85–95° for this reconciliation to be properly effective. As all points of the casing expand radially outwards without restraint the links all pivot and no stress is induced within the casing itself or upon the shaft bearings 17. The free growth of the casing structure will be as much as 0.22" with a casing of 35" diameter with exhaust gas temperature of 400° C.

Figure 3:
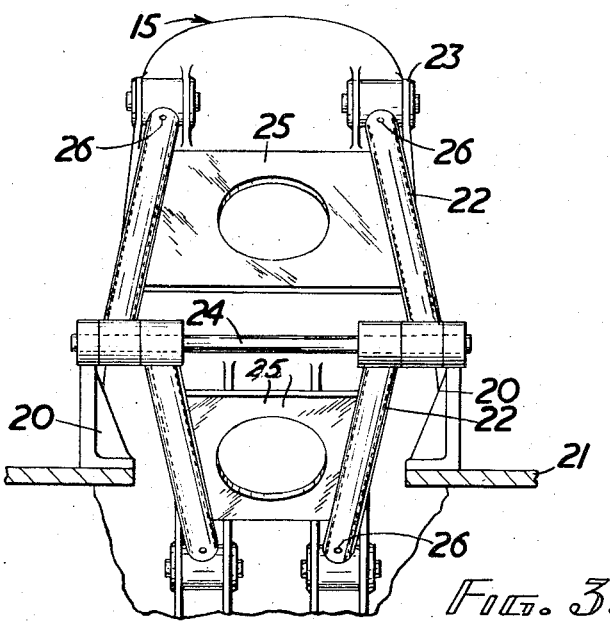
Figure 3 is a part side view showing details of the supporting links and attachment devices.

From Figure 3 the longitudinal arrangement of the support for the casing structure will be more clearly seen. There are two axially-spaced mountings 20 on both sides of a vertical plane through the rotor shaft axis, those on one side being shown. Two links 22 are pivotally connected to each mounting, a common shaft 24 passing through all four link pivots and the two mountings. Bridge plates 25 are fitted between the two links above the axis of the shaft 24 and between the two links below that axis also. These bridge plates give additional rigidity in an axial direction.

It is undesirable for the high temperature which the exhaust casing structure is bound to attain to be transmitted to the mounting. For this reason the links 22 are made up of hollow tubes. The shaft 24 is also hollow and there are small holes (not shown) which give access for cooling air to enter from the hollow shaft 24 into the links. Further holes in the tubular links are shown at 26 and these complete a passage for the free circulation of cooling air by natural convection in through the hollow shaft 24, internally along the links and out through the holes 26.

Figure 4:
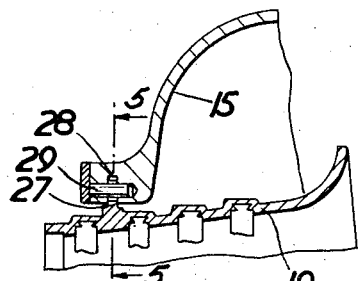
Figure 4 is a more detailed view of the way in which the stator blade ring is carried by the exhaust casing structure.
Figure 5:
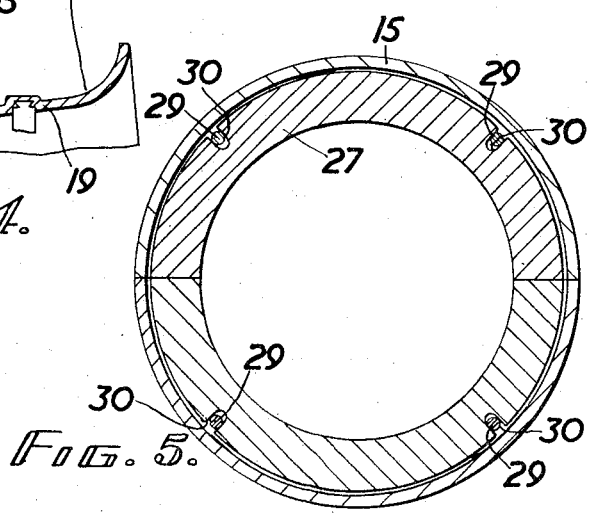
Figure 5 is a section on the line 5—5 of Figure 3.

In the explanation of Figure 1 it was stated that the casing structure 15 carried internally the stator blade carrier 19 and the compensating arrangement for differential expansion between these two parts is shown in Figures 4 and 5. The stator blade carrier is provided integrally with a flange 27 which is arranged to nest within a groove 28 in the exhaust casing 15. Central location of the blade carrier is obtained by four dowel pins 29 sliding in radial slots 30 cut in the flange 27. If it is horizontally split as shown four pins are necessary. Relative radial expansion of the blade carrier within the exhaust casing is thus allowed for and the concentric relationship of the carrier to the shaft axis, an imperative requirement, is ensured under all operating conditions.

A preferred embodiment of the invention has been described above in which the exhaust casing structure is supported by eight links in two axially-spaced pairs of two links on either side of the supported structure. In this way thermal expansion of the casing without internal stress and distortion is obtained and axial support is also provided. Alternative embodiments of the invention can be contemplated and some are illustrated diagrammatically in Figures 6 and 7. In all of these it is essential that there is a fixed mounting on either side of the structure and that at least three links are employed. The substantially normal relationship between the link and the line joining the shaft axis to the appropriate attachment device is also essential to cope with the radial expansion without any tendency to displace the shaft axis. The possible arrangements shown in Figures 6 and 7 are illustrative only of the many alternatives to the preferred arrangement already described.

Figure 6:
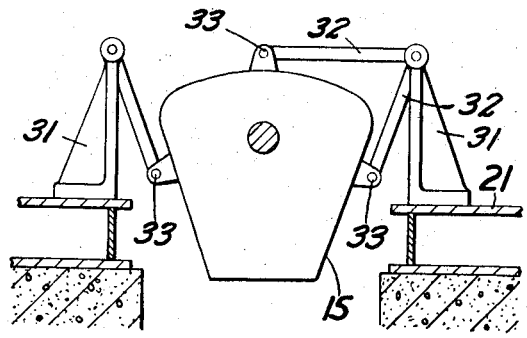
Figures 6 and 7 show diagrammatically examples of other embodiments of the invention.

In Figure 6 there is diagrammatically illustrated a casing structure 15 external to rotary machinery the shaft of which is shown cross-hatched. The casing structure is supported from two mountings 31 one on each side of a vertical plane through the shaft axis. The mountings are rigidly fixed to a body plate 21. Links 32 pivotally attached to the mountings 31 support the casing structure by means of the attachment devices 33. In Figure 6 there is shown the minimum arrangement suitable for permitting geometrically similar expansion of the casing structure, that is everywhere permitting radial expansion but preventing any rotational tendency of the casing structure 15. It will be seen that the link 32 on the right hand side of the figure connected to the attachment device 33 also on the same side of the casing structure is arranged in the opposite sense from the other two links.

Figure 7:
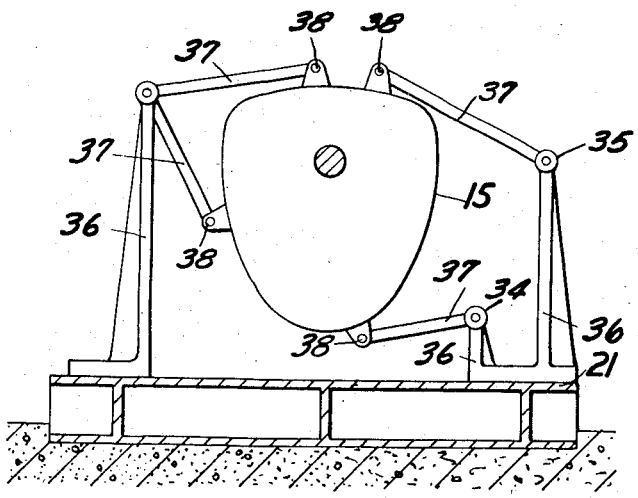

A generally similar arrangement is shown in Figure 7 except that in this case two links 37 are pivotally connected to the mounting 20 on the left hand side of the figure, while the two links 37 which are provided on the right hand side of the figure have separate mounting pivots. In this case there are two links in each sense so that balancing of the torques developed within the machine is simply achieved.

What I claim is:

1. In combination with a gas turbine bladed rotor, a shaft carrying said rotor, a bladed stator part co-operable with said rotor and a casing structure enclosing said rotor and required to be maintained in geometrically similar radial relationship with the shaft axis despite appreciable radial expansion of the structure, a supporting arrangement for the casing structure and the stator part comprising a mounting external to the structure, positioned on each side of and in a first normal plane to the vertical plane through the shaft axis and fixed relative to that axis, at least three attachment devices on and fixed to the outside of the casing structure and lying substantially in said normal plane, at least three links each of which is pivotally connected directly both to a separate one of said attachment devices and to one of said mountings so as to be substantially at right angles to a line joining the shaft axis to said one attachment device, at least one of which links is arranged in the opposite sense from the remainder thereof so as to counteract rotational tendencies of the structure, a further set of mounting links and attachment devices similarly pivotally interconnected, lying substantially in a second normal plane parallel to but axially spaced from said first normal plane and likewise permitting expansion of the casing structure only in said geometrically similar radial relationship, a radial flange on said stator bladed part, at least three circumferentially spaced radial slots in the flange periphery and dowel pins, one per slot, fixed to said casing structure and slidable in the slots so that radial expansion of said stator part is permitted but rotation is prevented.

2. A rotary machinery combination comprising a rotor including a shaft, a structure surrounding said rotor and required to be maintained against rotation and in a geometrically similar relationship with a fixed axis despite appreciable radial expansion of the structure, a supporting arrangement for the structure comprising at least three attachment devices on and fixed to the outside of the structure, at least one mounting external to the structure, positioned on each side of and in a plane normal to a vertical plane through said axis and fixed relative to said axis, at least three links each of which is pivotally connected directly both to a separate one of said attachment devices and to one of said mountings so as to be substantially at right angles to a line joining said axis to said one attachment device, at least one of said links being arranged in the opposite sense from the remainder thereof so as to counteract rotational tendencies of the structure, and means to support said shaft externally of said structure so that the axis of said shaft is maintained colinear with said fixed axis.

3. A rotary machinery combination comprising a rotor including a shaft, a structure surrounding said rotor and required to be maintained against rotation and in a geometrically similar relationship with a fixed axis despite appreciable radial expansion of the structure, a supporting arrangement for the structure comprising at least eight attachment devices on and fixed to the outside of the structure of which two are above and two below a horizontal plane through said axis on each side of a vertical plane through said axis, at least one pair of axially spaced mountings external to the structure, positioned on each side of said vertical plane and fixed relative to said axis, links interconnecting said attachment devices and said mountings, each link being pivotally connected both to a separate one of said attachment devices and to one of said mountings shared with another link so as to be substantially normal to a line joining said axis and said one attachment device, and means to support said shaft externally of said structure so that the axis of said shaft is maintained colinear with said fixed axis.

4. A rotary machinery combination comprising a rotor including a shaft, a structure surrounding said rotor and required to be maintained against rotation and in a geometrically similar relationship with a fixed axis despite appreciable radial expansion of the structure, a supporting arrangement for said structure comprising a mounting external to the structure, positioned on each side of and in a first plane normal to a vertical plane through said axis and fixed relative to said axis, at least three attachment devices on and fixed to the outside of said structure and lying substantially in said first normal plane, at least three links each of which is pivotally connected directly both to a separate one of said attachment devices and to one of said mountings so as to be substantially at right angles to a line joining said axis to said one attachment device, at least one of which links is arranged in the opposite sense from the remainder thereof so as to counteract rotational tendencies of the structure and a further set of mountings links and attachment devices similarly pivotally interconnected, lying substantially in a second normal plane parallel to but axially spaced from said first normal plane and likewise permitting expansion of the casing structure only in said concentric and geometrically similar radial relationship, and means to support said shaft externally of said structure so that the axis of said shaft is maintained colinear with said fixed axis.

References Cited in the file of this patent

UNITED STATES PATENTS

| | | |
|---|---|---|
| 1,670,452 | Kaehler | May 22, 1928 |
| 1,873,743 | Doran | Aug. 23, 1932 |
| 1,969,556 | Guy | Aug. 7, 1934 |
| 2,481,547 | Walker | Sept. 13, 1949 |
| 2,529,958 | Owner | Nov. 14, 1950 |
| 2,587,345 | Lombard | Feb. 26, 1952 |

FOREIGN PATENTS

| | | |
|---|---|---|
| 351,486 | Italy | Aug. 12, 1937 |
| 492,085 | Great Britain | Sept. 14, 1938 |
| 583,713 | France | Nov. 5, 1924 |
| 648,175 | France | Aug. 7, 1928 |
| 955,996 | France | July 4, 1949 |